Nov. 8, 1932.  E. SLADE  1,886,447
APPARATUS FOR MAKING STRANDS AND COVERED WIRES
Original Filed June 17, 1925  10 Sheets-Sheet 9

Patented Nov. 8, 1932

1,886,447

UNITED STATES PATENT OFFICE

EDWARD SLADE, OF NEW YORK, N. Y.

APPARATUS FOR MAKING STRANDS AND COVERED WIRES

Application filed June 17, 1925, Serial No. 37,606. Renewed March 26, 1932.

My invention relates to a new and useful method of and apparatus for making a composite strand or covered wire, consisting of a core, a covering and a binder. The object of the invention is the provision of a new method and means of making the strand in a single operation, wherein the cover and the binder may be wound or twisted or convoluted around the core in opposite directions. The invention also consists in the articles thereby produced.

The core may be a mere strengthening element for the cover, as in the case of strand produced for brake lining manufacture, as hereinafter described, or the cover may be a mere protection for the core, as in the case of the electric conductor hereinafter described, or the binder may be the main feature of the article.

The invention achieves the rapid and cheap construction and manufacture of a class of articles having a core, covering and binder, and such articles are capable of many different uses and applications in the practical arts, and my method and apparatus enables such articles to be cheaply and economically manufactured at the same time that they are given the necessary waterproofing, fireproofing, abrasive and dielectric qualities necessary in the construction of such articles, and furthermore the articles so made are capable of standing bending and twisting strains, and of remaining flexible.

In particular, my device is applicable to the construction of asbestos strands or covered wires. In one form of my method and apparatus, I have described the construction of an electrical conductor, consisting of a core of copper or other electrical conducting metal, covered preferably by a plurality of asbestos strips bound by a binding element and wherein, as a result of the operation, the asbestos covering strips and the binding element may be wound around the core in convolutions in opposite directions. Furthermore, I have provided means whereby the operator of the machine may by easy adjustments ensure that the winding of the plurality of asbestos strips around the wire is such that the line of edges of one of the strips may be out of register with the line of edges of the second covering strip, and wherein one of the covering strips envelops wholly the other.

In another form of my invention, a strand is constructed composed entirely of asbestos and fine wire twisted together. This form of strand is particularly adapted for weaving into fabric for brake linings and for similar purposes. In this form of strand, the core is composed of a thin metallic wire, as is also the binding element. I preferably employ a single asbestos strip as a covering. Both the light metallic core and the light binding wire are by my method twisted in and with the asbestos strip in such a way that a strong and otherwise suitable strand is formed which, when woven into fabric and suitably treated, may form an ideal brake lining. Furthermore, I am able to make a strand composed entirely of asbestos and wire and which is therefore non-inflammable, and I am able to make use of asbestos strips of short-fibered asbestos, thereby cheapening to a considerable degree the cost of the strand.

My invention also relates to the use of various lubricating and impregnating solutions hereinafter referred to, in connection with the process of manufacture of the strand or wire. My resulting product has the necessary waterproof, fireproof and abrasive withstanding qualities, and is sufficiently flexible to withstand all bending and twisting strains.

While I have described my invention in its preferred forms, it is to be understood that I do not limit myself, but the invention comprises the novel methods, devices and products hereinafter described and claimed.

In the drawings,

Fig. 3 is a side elevation of drying and dusting part of machine;

Fig. 6 is an entrance elevation of folding and guiding means;

Fig. 18 is a view of such a built-up conductor;

Fig. 33 is an end view taken along the line 33—33 of Fig. 19, showing in further detail positive braking means for use in sudden stoppage of the machine; and Fig. 34 is a view of a modified strand or yarn of asbestos-covered wire suitable for brake lining, the product of the machine shown in Figs. 13–33.

My method of forming a strand or covered wire in general includes the advancing of a wire or other core metallic element through the machine and loosely applying to the core a strip or a plurality of strips of asbestos or other fibrous material at a point rearwardly positioned, and applying a binding element under tension around the core and loosely-applied covering at a point further advanced with respect to the advancing core. The application of the binding element to the core and to the loosely-applied covering tends during the operation of the machine to cause the loosely-applied covering strip or strips to assume a convolute form on the core from the point of application of the binding element rearwardly to a point where means are provided for preventing the further twisting or rotation of the strips. This latter means consists of a folding die and a guiding mechanism such as a cross bar. The former may be adapted to shape the incoming covering strips by turning down or upwards the edges thereof so as to wrap readily around or envelop the core, or, in the case of a secondly applied covering strip, to envelop both the core and the whole of the first applied covering strip. The guiding mechanism, which preferably is embodied in a cross bar located in the folding dies themselves or adjacent thereto, is adapted to prevent any twisting or rotation of the strips due to the application of the binding element from passing any further rearwardly. The combination of the application of the binding element under tension and the mechanism rearwardly spaced holding the strips from further twisting or rotation, has the result of causing the covering strip or strips as fed with the advancing core to assume a convolute form around the core prior to and at the point of application of the binding element.

An advantage derived from the use of my method is that the core is completely and uniformly covered by the covering strips in convolutions before binding. After binding, the frequency of the convolutions of the covering strips may become somewhat lessened and may possibly entirely disappear. The presence of the convolutions at the binding point, however, ensured the complete and uniform wrapping of the covering strips around the core.

Furthermore, I have found, where a plurality of covering strips are applied to the core, that by the use of suitable adjusting mechanism adjacent the point where the folding and guiding dies are located and where the covering strips form a juncture with the advancing core and assume convolutions around it, I am enabled to form a strand in which one of the covering strips envelops within itself the whole of the other covering strip, and wherein the line of edges of the enveloping strip may be kept entirely out of register with the line of edges of the eneveloped strip. The result of this adjustment is that the strand is formed with a plurality of coverings in which the line of edges or the strip between the overlapped edges of one is wholly covered by the body of the enveloping strip. As a result, when the strand is bent or flexed during use, there will be no tendency for the core to uncover.

I will now describe a machine in which the above-described method may be carried out, for making an electrical conductor with a covering or a plurality of coverings of asbestos or other fibrous materials, firmly held by a binding element.

This embodiment of the invention includes a bed 1 which is supported by a frame 2, and which in turn supports the operating mechanism of the machine. A supply roll 4 for the core wire 3 is mounted at one end.

The wire core passes around the pulley and thence through fixed guides and through the machine. The covering strips and the binding element are applied to the core during its passage through the machine as hereinafter described. The core is advanced by means of core-advancing wheels 10. If desired, the core may, prior to its entrance into the machine be passed through a tensioning device. In the present embodiment of my invention, I have illustrated the core as being covered by two fibrous strips by a material such as asbestos and a third fibrous strip of preferably greater width and of greater tensile strength, such as a vegetable fiber matted material known as Japanese tissue paper. The strips are applied and bound to the core in the following manner.

Asbestos covering strips 11 and 13 are supplied from spools 12, as may be also strip 15 of Japanese tissue paper. The strips may be mounted on independent rolls themselves mounted on the shaft 7 of the spool 12. The individual rolls may be replaced when depleted. Any other suitable methods of supplying the strips may be used.

The strips 11 and 13 pass from the spools into an impregnating bath contained in a tank 16 passing under guides 17. This bath should be of a nature such that it will render the strips waterproof, cement the assembled core and covering, and render same a homogeneous mass. At the same time, the bath should soften the strips and render them more easily wrapped around the core, and also render the conductor or other strand which is ultimately built up more capable of withstanding abrasive and twisting strains. I have found that an impregnating solution, including nitrocellulose and a non-oxidizing oil, fulfills the requirements, and I therefore contemplate in the preferred form of the invention using this solution. Such a solution is at present on the market under the name "Hermatite". In addition to the qualities above enumerated, this solution has high dielectric qualities. The fibrous strip 15 may also be passed through this bath or may be precoated with the solution and pass directly to the wipers or to the core. The precoating is advantageous in that it allows a thorough and complete impregnating and consequently a material increase in the tensile and waterproofing qualities of the strip. After passing through the impregnating solution in the tank 16, the covering strips pass around the edge of a wiper 30 where the first excess of the solution is taken off. The position of wiper 30 is adjustable by means of adjusting screw 31.

The covering strips after passing by wiper 30 pass against an oppositely disposed additional wiper 32 and thence into further wiping mechanism 33 comprising a bottom member 34 having an upper felt or other wiping surface 34' and a loosely fitting cover 35. The cover is likewise provided on its under side with a wiping surface 35'. The wiper 33 may be adjusted to remove the proper amount of solution by the addition or removal of weights to or from the cover. The upper portion of the wiper is provided with a groove 37 adapted to permit the passage of the wire core.

The wire core 3, as previously described, passes from the feed roll 4 around the pulley 8 and through the fixed guide 40 to the wiping mechanism through which it passes along with the covering strips, thereby receiving a certain amount of the impregnating solution. Thus in the finished strand the impregnating solution not only saturates the covering, but is applied between the core and the covering itself. If the additional strip of thin fibrous material of greater tensile strength, such as Japanese paper, is likewise applied, it may be desirable to pass this strip through the impregnating bath. In any event, the passage of the strips of covering material and the core together through the wiping mechanism 33 not only removes the excess amount of solution but causes the same to be thoroughly impregnated with the remaining solution.

The wipers 30 and 33 are adjustable longitudinally along plate 41 by means of adjusting screws 31 and 39. The folding and guiding mechanism 25 is likewise adjustable longitudinally along this plate by means of set screw 42 and is adjustable vertically through screw 41'. The three members comprising the two wipers and the folding and guiding bridge are therefore all adjustable in respect of each other and with respect to the point of application of the binding element hereinafter described. Adjustments of these three elements can be made by the operator to secure the best folding results and to cause the proper amount of solution to remain with the covering strips and pass into the finished strand.

After leaving the wipers, the core 3 and the covering strips are adapted to pass through a folding and guiding die mechanism. This folding and guiding die mechanism comprises in its preferred form a bridge 25 having a central die seat $a$ adapted to receive a removable die 26 having a passage of relatively small diameter. Transverse the die is a cross bar 26'. Spaced laterally from the central die are die seats $b$ in which are adapted to be located removable folding dies 27 and 29. The longitudinal axes of these dies may be arranged to be located at an angle to the advancing core, but in the preferred form the axes are parallel with that of the advancing core. The dies 27 and 29 are provided with cross bars 27' and 29'. The dies are rotatable in their seats, being held in place by set screws $d$, thereby making the angular position of the cross bar adjustable. Attached to the bridge 25 of the folding and guiding mechanism are L-shaped strip angle adjusting devices 28. These devices are releasably held in place by means of set screws $e$. By releasing the set screws, the point of the angle-setting device can be placed at any desired position and angle adjacent the laterally-spaced dies 27 and 29.

Figures 7, 13, 14:
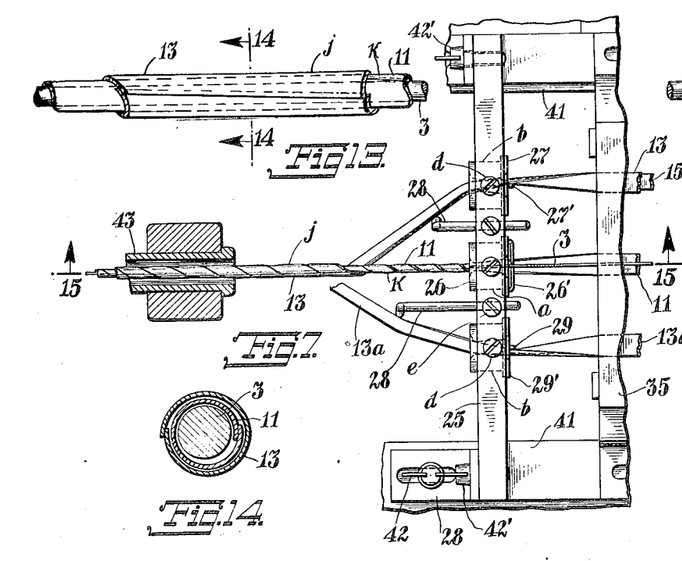
Fig. 7 is a plan view of the folding and guiding means of Fig. 6.
Fig. 13 is a side view of the wrapped core after wrapping correctly.
Fig. 14 is a section of same showing overlapping of edges of wrappings and correct relative position of line of edges of covering strips.

The core 3 and the strip 11, which is the first covering strip to be applied to the core, passes through the central die 26, the core and the strip 11 passing on opposite sides of the cross bar 26', the core being preferably on the upper side of the bar and the strip on the lower side. The strip 11 is held against rotation or twisting by the cross bar 26'. The other covering strip 13 passes through one of the laterally-spaced dies, such as die 27, and is held by the cross bar 27' against rotation or twisting, and is also positioned angularly by the cross bar and by the angle-setting device 28. A further covering strip 13$a$ may, if desired, be led in a similar way through the laterally spaced die 29 and likewise positioned angularly. It is preferable to lead the additional fibrous strip 15 of Japanese tissue paper through one of the lateral spaced dies along with one of the covering strips. In Fig. 7 I have shown the Japanese strip 15 being led through die 27 behind covering strip 13. The covering strip thereby helps lead the relatively thinner Japanese paper strip through the machine.

During the operation of the machine, due to the action of the binding element, immediately after the passage through the folding and guiding mechanism, the strip 11 assumes an enveloping form about the advancing core. At a point further advanced, the strip 13 joins the core and for the same reason envelops the core and the whole of the first applied covering. The strip of Japanese tissue paper 15 likewise envelops both asbestos coverings.

The cross bars 26', 27' and 29' and the guiding mechanism generally hold the respective strips from rotation or twisting, and serve as a base for the action of the binding element in twisting the losely-applied covering strips around the advancing core. The operation of the strips in assuming this convolute form prior to the application of the binder is plainly visible to the operator of the machine, and adjustments can be made of the various parts of the folding, guiding and wiping mechanism to ensure the proper convolute form of the strips at that point. Furthermore, by adjusting the angle of the cross bars in the dies 27 and 29 and the position of the L-shaped angle-adjusting device 28, the operator can so arrange the forming of the convolutions by the covering strips up to the binding point that the line of edges $j$ of the enveloping strip is entirely out of register with and opposite to the line of edges $k$ of the first enveloped strip as illustrated in Fig. 7. Once set, the convolutions will continue in the same way. The result of so arranging the convolutions is that the finished strand is provided with two coverings, one enveloping the whole of the other, and with their respective lines of edges of one strip out of register with and substantially opposite to the line of edges of the other.

A further function of the folding and guiding mechanism is that both the central passage 26 and the passages 27 and 29, all preferably tapered act as folding dies for their respective covering strips. The passages and dies being of smaller diameter than the strip passing therethrough, the edges of the latter are turned inwardly and the same assumes a U-shaped sheathlike form. The diameter of the die 27 being greater than that of the passage 25, the covering strip 13 is folded to a less degree than the strip 11 and thereby more readily wraps around and envelops both the core and the first applied strip 11.

The core with its loosely-wrapped coverings is then adapted to pass through a hollow shaft 43 but without coming into operative contact with such shaft. The hollow shaft 43 is rotatably supported in bearings 44 carried by standards 44', the rotation being caused by suitable chain connections with the motor 46, operated by a switch 47. A winding head 48 is rigidly associated with the hollow shaft 43 and is adapted to revolve therewith. A guide plate 49 is likewise secured to the end of the hollow shaft and in spaced relation to the head 48, being provided with an opening 50 having a cushion 51 therein. The opening and cushion are adapted to serve as a guide for the binding element during its application.

Figures 8, 9, 11, 12:
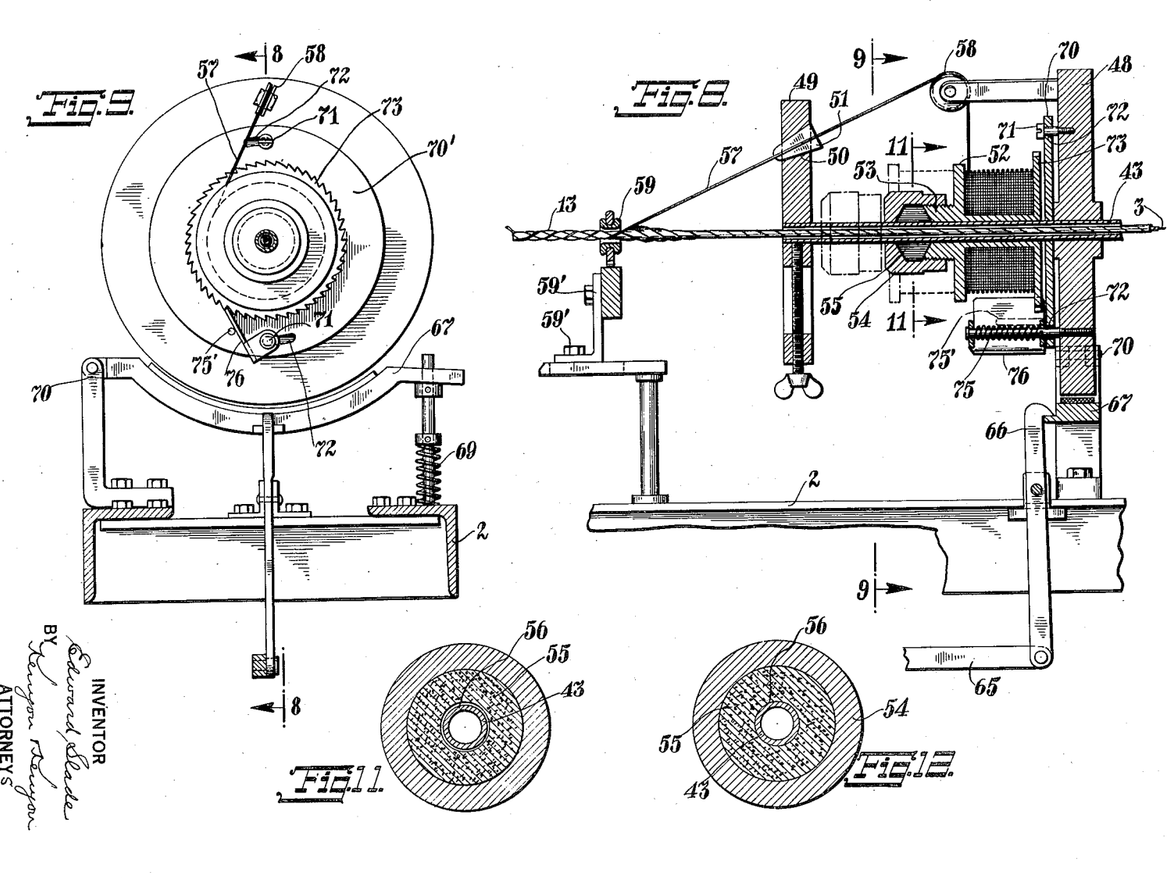
Fig. 8 is a side section of the rotatable head, binder supply and binder-applying mechanism.
Figs. 11 and 12 are detailed sections of adjustable stuffing box taken along line 11—11, Fig. 11 illustrating stuffing box in loosened position and Fig. 12 the same in tightened position.
Figure 9:
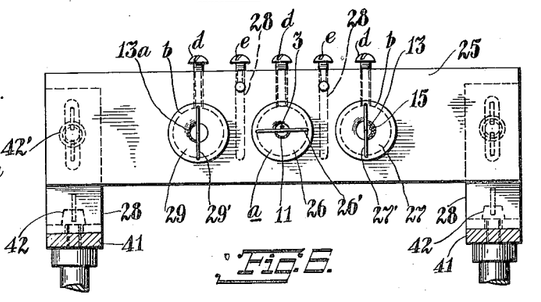
Figure 15:
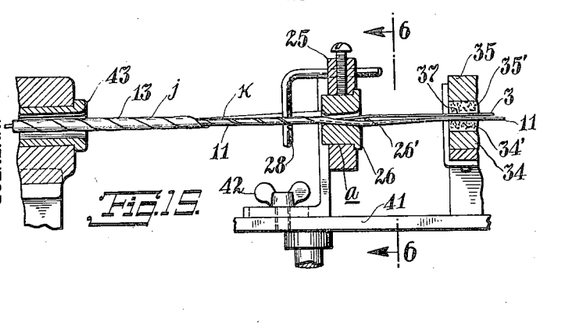
Fig. 15 is a side section bisecting the folding, guiding and wrapping mechanism along line 15—15 of Fig. 7.

The binding element is contained on a spool 52 which is mounted to rotate upon and move longitudinally with the hollow shaft 43 in the space between the winding head 48 and the guide plate 49. Its rotating movement upon the shaft 43 is controlled by an adjustable stuffing box 53. The stuffing box 53 includes a cap 54 adapted to screw down upon the head of the spool and in doing so to compress the leather washer 55 around hollow shaft 43, thereby causing frictional engagement. In Fig. 11 is shown a cross section of the stuffing box prior to the adjustment and showing the leather washer 55 surrounding the hollow tube 43 but leaving a circular gap 56 between same. In Fig. 12 is shown the same cross section after adjustment.

Figures 1, 1B:
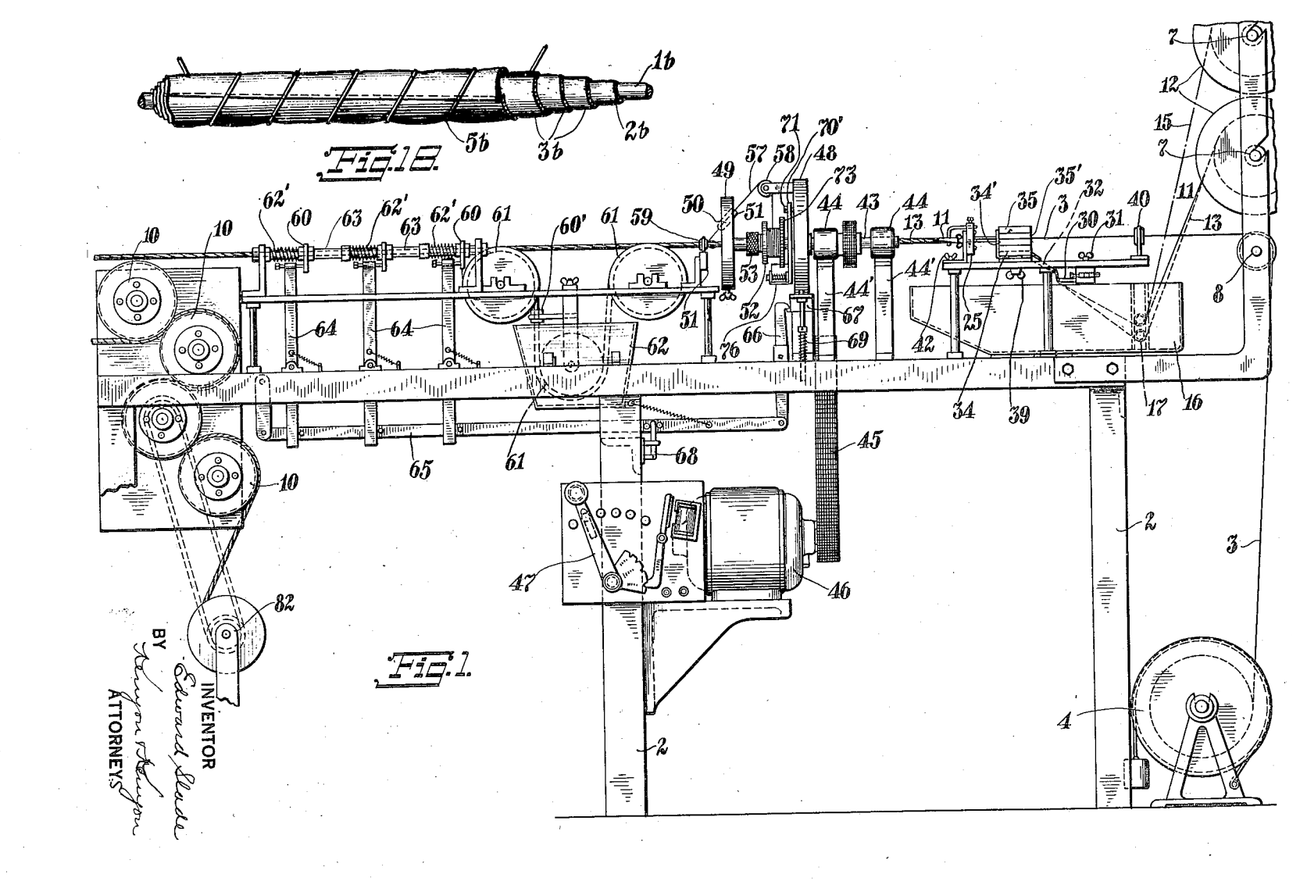
Figure 1 is a side elevation of a machine embodying my invention, more particularly adapted for the construction of an asbestos-covered electrical conductor.
Figures 2, 9, 10:
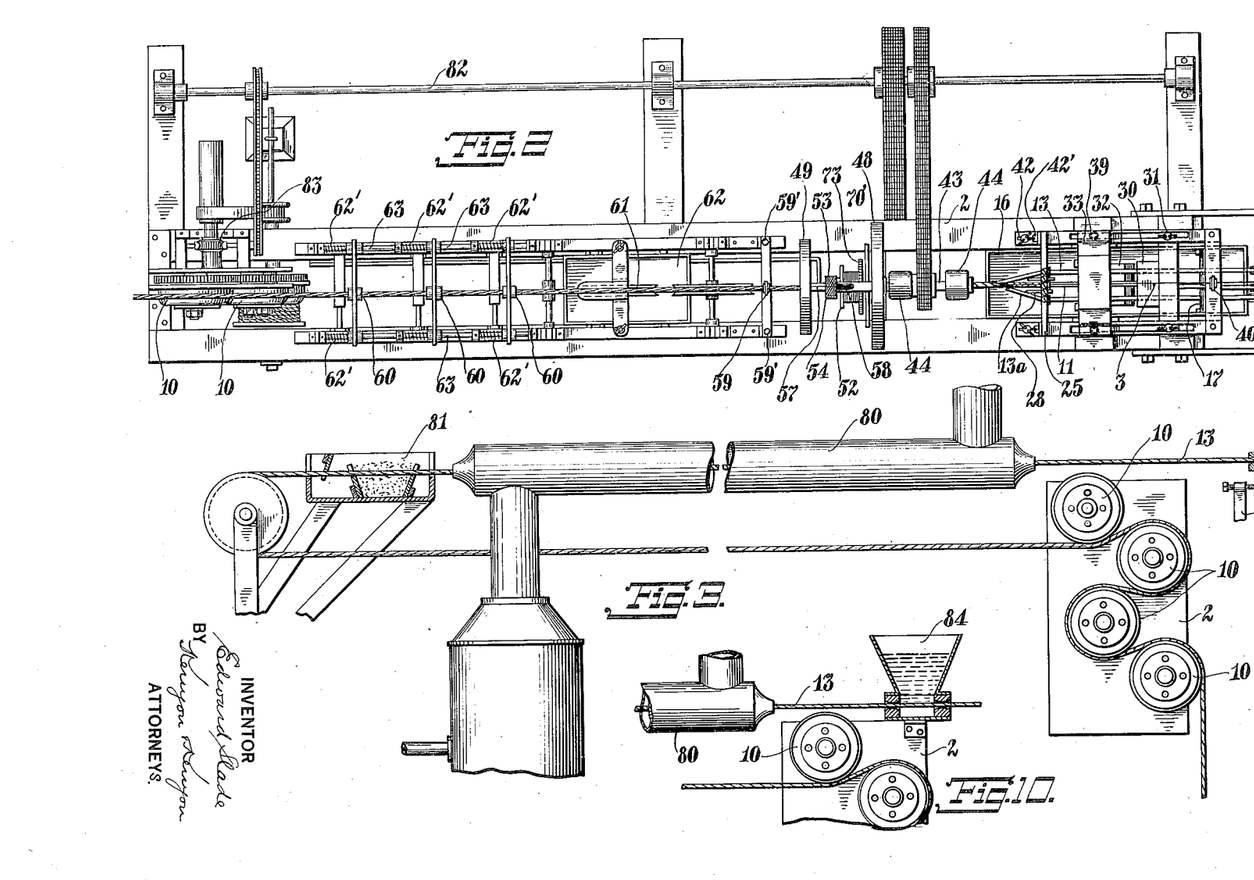
Fig. 2 is a plan view of the machine.
Fig. 9 is a front view taken along 9—9, showing in further detail the positive braking means for use in the event of sudden stoppage of the machine.
Fig. 10 is a view of a modified form of the drying end of the machine showing a supplementary coating tank.
Figures 4, 4A, 5:
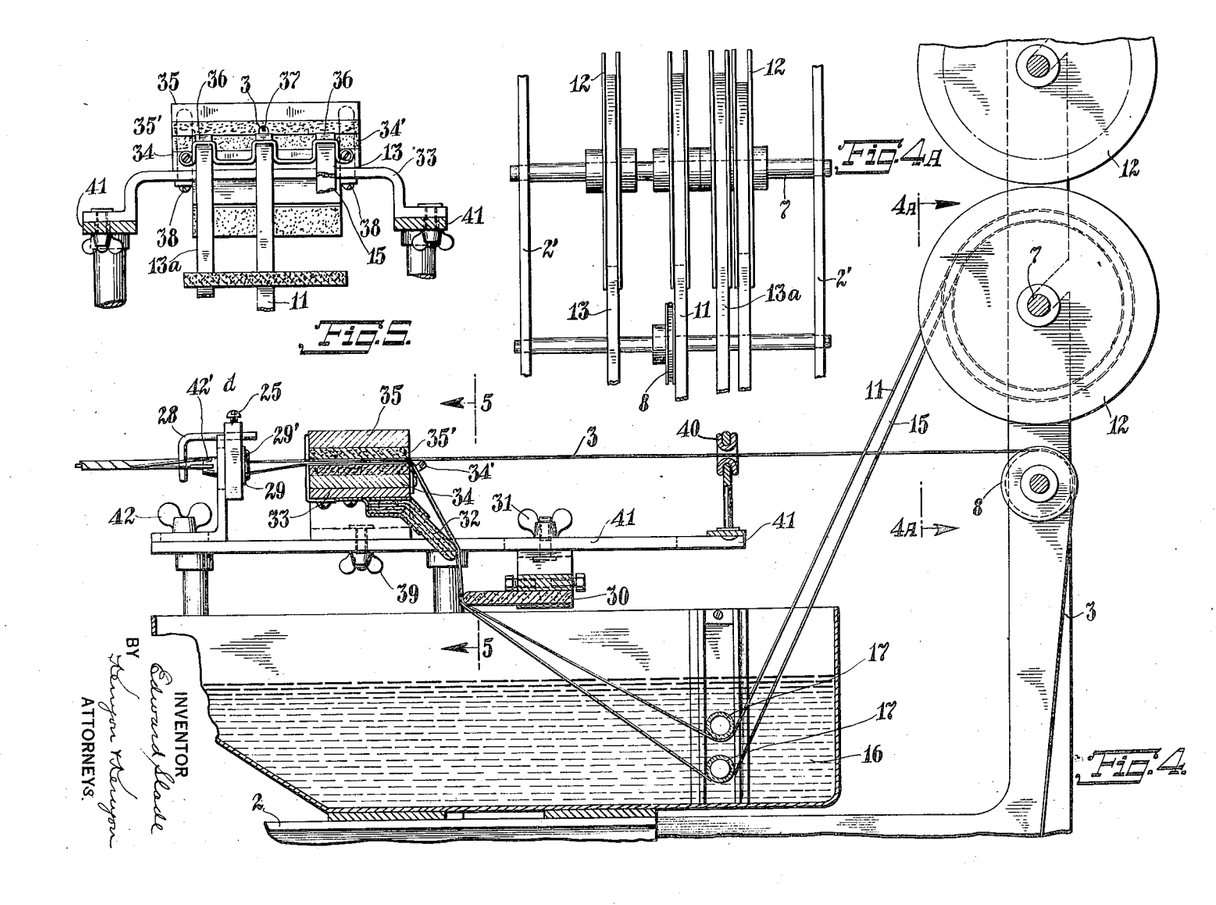
Fig. 4 is an enlarged sectional view showing arrangement of the feeding, guiding and impregnating means for the covering strips.
Fig. 4A is a view looking in direction of 4A—4A of Fig. 4.
Fig. 5 is an end view of wiping attachment along line 5—5 of Fig. 4.

The binding element 57 is wound around the spool as shown in Figs. 8 and 9, preferably in the direction of rotation of the head, and passes around pulley 58 carried by a post on the head and thence through the opening 50 in the guide plate 49 and to the core. The core, with the covering strips loosely applied thereto in convolutions, after passing through the hollow tube, emerges therefrom and passes through a fixed guide 59. This guide is adapted to prevent the ballooning of the strand and to minimize vibration of same. The position of this guide is adjustable by means of screws 59'. The character of binding is effected by the spaced relation of this guide to the plate 49, fixing, as it does, the point of application of the binding element.

The binding element reaches the core just prior to its entrance into the guide 59 and, by the spinning action of the revolving head, is bound tightly around the same at that point. The frictional engagement between the spool 52 and the rotating tube and head causes the binder to be applied to the core under tension. The loosely-applied coverings on the core are thereby twisted or rotated upon the core. This results in convolutions forming at the point of application of the binding element and extending rearwardly to the folding and guiding mechanism 25 where the strips are held against further twisting or rotation. The convolutions of the covering on the strand thus formed are opposite to convolutions assumed by the binding element around the advancing strand.

By applying a binding element under tension at a given point to a core surrounded by loosely-applied coverings and holding such coverings at a point rearwardly spaced from the binding point, I have provided a simple and effective means of wrapping the coverings on the core and completely enveloping the core with the coverings and binding same. The advancing core carries with it the coverings and the binding element and is the operative force for feeding the covering strips to the core and for drawing the binding element from the spool to the place of its application to the core and coverings as a binder. Because of the sequence of the application of the covering strips to the core and by means of the adjustments provided in the folding and guiding mechanism, I can envelop about a core a plurality of coverings with one of such coverings enveloping the whole of another enveloped covering, and bind same securely to the core with the line of edges of the covering strips themselves out of register with each other.

The now built-up strand, after passing through the guide 59 and having the binding element 57 applied thereto, either passes directly through a series of graduated dies 60 or around pulleys 61 and downwardly into a coating tank 62 in which may be contained an additional impregnating or coating solution and thence upwardly through a wiping die 60'. The use of this tank, however, is optional.

The graduated dies 60 serve to compact and size the built-up strand and also to remove any remaining excess of the impregnating or coating solutions. These dies are mounted on frames which in turn are slidably supported on rails 63. They are normally held in a position of rest by springs 62' and are adapted to move against the tension of the springs when undue strain is placed upon them by a stoppage or clogging in the dies. Such undue pressure will cause a series of pivoted levers 64 on which the dies are mounted to operate longitudinally a bar switch member 65, which in turn will operate pivoted lever 66. The bar 65 will also operate electrical switch 68, shutting off the motor. The rotatable head 48 is provided with a braking mechanism 67 normally held out of engagement by means of a catch on the pivoted trip 66. A spring 69 tends, except for the catch on the trip 66, to force the brake 67 in frictional engagement with the revolving head, the brake being pivoted at 70.

When stoppage occurs in the dies, as previously described, the bar 65 will operate switch 68, shutting off the motor, and will also cause the pivoted trip 66 to release the brake 67 which will spring into engagement with the revolving head and brake same.

The spool 52 carrying the binding element, except for the frictional engagement through the packing box 54, is free to rotate on the hollow tube 43 and the head 48. In order to prevent the breakage of the binding element due to the continued rotation of the spool upon the cessation of rotation of the head, either due to the clogging of the dies or the normal stoppage of the machine, I have provided positive means for preventing such continued rotation despite the momentum of the spool.

A face plate 70' is mounted on the hollow tube and held to the head 48 by screws 71 which are mounted on the head through slots 72. Thus the face plate is permitted a rotational movement with respect to the head to the extent of the length of the slots 72. The spool 52 is provided with a ratchet 73. A dog 76 is pivoted on one of the screws 72 and is normally urged into engagement with the ratchet by the resilient member 75. The face plate 70' carries a pin 75' which is adapted to engage the dog 76 upon rotation of the face plate 70' with relation to the head 48, to force the dog into engagement with the ratchet 73. This position of the face plate is shown in Fig. 8, which represents the head and spool at rest and with the dogging means arresting the motion of the ratchet 73 and spool 52 in a counter-clockwise direction with respect to the head 48.

Upon the commencement of operation of the machine, both the head 48 and the spool 52 commence to rotate in a counter-clockwise direction as shown in that figure and at the same speed. The face plate will lag the length of the slots and then assume the same rotary speed. The movement of the plate the length of the slots, however, causes the pin 75 to move away from the dog 76, the dog, however, being held against the ratchet by the spring 74. As the binder 57 is unwound from the spool, the spool tends to rotate at a slightly retarded speed. Thus at this point the spool and ratchet are moving with respect to the head in a clockwise direction and the dogging means is idly passing over the serrated teeth of the ratchet. As the speed increases, centrifugal action will cause the dog to be thrown out of engagement with the ratchet. Upon a stoppage of the counter-clockwise rotation of the head 48, the face plate 70' will continue the rotation. The pin 75 will engage the dog 76 and throw the same into engagement with the ratchet 73, immediately and positively preventing the counter-clockwise rotation of the spool upon the cessation of rotation of the head. There will thereby be prevented an undue strain on the binding element which would be caused by the tendency of the spool to revolve after the head has stopped and resulting breakage. Thus I have provided not only a ratchet means for preventing the rotation of the spool after the head has stopped, but positive means for causing same to be immediately engaged.

The strand, after leaving the last of the dies 60, preferably passes through a dryer 80 in which the direction of flow of the drying air is opposite to that of the movement of the strand. Thus the impregnating solution, which during the passage of the strand through the machine acts as a lubricant for the several dies, is dried and does not become tacky. If desired, the dried strand may then be passed through a duster 81 where a dusting composition of asbestos floats or powdered mica may be applied to the outside of the strand to obviate any possibility of the continuance of the existence of any tacky portions.

The strand after leaving the dusting device 81 passes around a pulley for changing its direction and thence to the core-advancing wheels 10, which are geared to each other and one of which is geared by means of a worm 83 to a shaft 82 driven by the motor through suitable connections. These core-advancing wheels provide the force for advancing the core through the machine and for causing the strips to be fed to the core and the binding element to be drawn from the spool and applied to the coverings and core.

It may at times be desired to dispense with the dryer 80, and this may be done simply by omitting the dryer and carrying the strand about the uppermost of the wheels 10 and thence around the remaining wheels. On the other hand, it may be desired to position the dryer at a different point in the machine, and this, too, is contemplated.

In some circumstances, it is possible that, in addition to the coating of the impregnating solution which the strand may receive from the tank 62, a further coating is desirable, and in this event I contemplate the placing of a coating hopper 84 on the machine, as shown in Fig. 10, between the last of the dies 60 and the dryer 80.

Thus it will be seen that I have provided a machine for, and a method of, building a strand such as an electrical conductor, which strand includes a core, a plurality of strip-covering elements if desired, and a binding element, which strips are so applied to the core and bound that the strips envelop and effectively cover the core, one strip enveloping the whole of a prior applied strip and, if desired, with the line of edges of the strips out of register with each other, and with a binding element wound in convolutions about the strips as to maintain them about the core. The method I have described will cause the covering to surround and envelop the core throughout.

Furthermore, the application of the impregnating solution to the strips prior to their being wound upon the core ensures their thorough impregnation and their adhesion to the core and each other, and the passage of the precoated strip, when such is used, through the wipers which remove the excess solution of the first-mentioned strips, ensures the application of the precoated strip to the partially strip-covered core in such condition that the precoating will be wet and will cause the adhesion of the strip to the strand. This adhesion, of course, is present even though the outside or later-applied strip is coated in the machine.

Furthermore, the article produced by this machine includes a covering which is made up of strips of sheath fibrous material, all of which are water- and flame-proof, and the outside one of which is of such great tensile strength that it increases the tensile strength of the entire covering.

The use of the composition of nitrocellulose and a non-oxidizing oil ensures the building up of a conductor which is not only flameproof and waterproof, but is also proof against the abrasive and twisting forces which are usually encountered in the use of such a conductor.

Furthermore, because of the compacting of the covering, the same is transformed into a homogeneous mass which is of a constant cross section and in which the core is centered.

Figure 16:
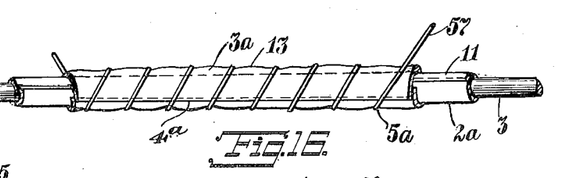
Fig. 16 is a side view of finished asbestos-covered electrical conductor.

In Fig. 16, I show a view of the finished asbestos-covered electrical conductor after the coverings have been wrapped around the core and bound on same and after the treatment described above has been carried out. As shown in this figure, the covered wire consists of a central conducting metallic wire 1a around which is closely wrapped a fibrous strip 2a, such as asbestos. The edges of the strip overlap each other slightly as shown. Around the core and the covering strip and enveloping the whole of the latter is a second covering strip 3a made of similar fibrous material. The edges of this strip may likewise overlap. It will be noted in this preferred form that the line of edges of the enveloping strip 3a is out of register with the line of edges of the enveloped strip 2a and is approximately opposite thereto.

Where the strips 2a and 3a are wrapped around the core 1 and the edges of such strips do not actually meet in a line, I include by the term "line of edges" in my description and my claims the part of the strip between the overlapped edges thereof or a line drawn intermediate between same such edges as shown in the dotted lines in Fig. 16 and designated 4a.

Covering strips 2a and 3a are held firmly on the core by means of a binding element 5a which has been wound around the same under tension. The covering strips during the process of wrapping the core have been impregnated with Hermatite or other suitable compounds as previously described.

Thus I have described a form of electrical conductor which consists of non-inflammable substances, and in which there is no necessity of using a rubber sheath or other insulation or gummy substance around the wire core or between the coverings; or, if desired, the perfectly finished covered strand may be impregnated and coated with rubber in place of the Hermatite solution. A suitable solution for this purpose is dispersed rubber. The construction is also such that a flexible covered wire is produced.

It is to be understood that the operations of covering a core with fibrous strips and binding same as described may be repeated successively in connection with the same strand, and thereby a resulting strand may be built up with a multiplicity of coverings bound thereon with suitable binders to bind same tightly.

Figure 17:
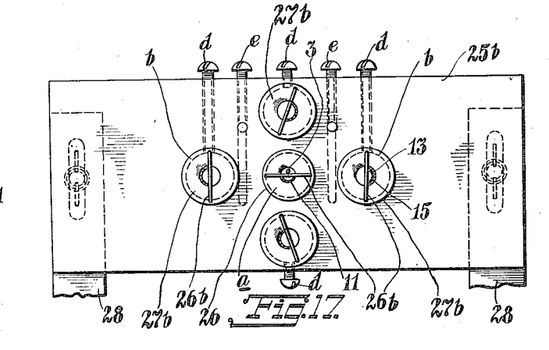
Fig. 17 is a bridge with a multiplicity of folding dies for making a heavily insulated electrical conductor.
Figures 19, 31, 32:
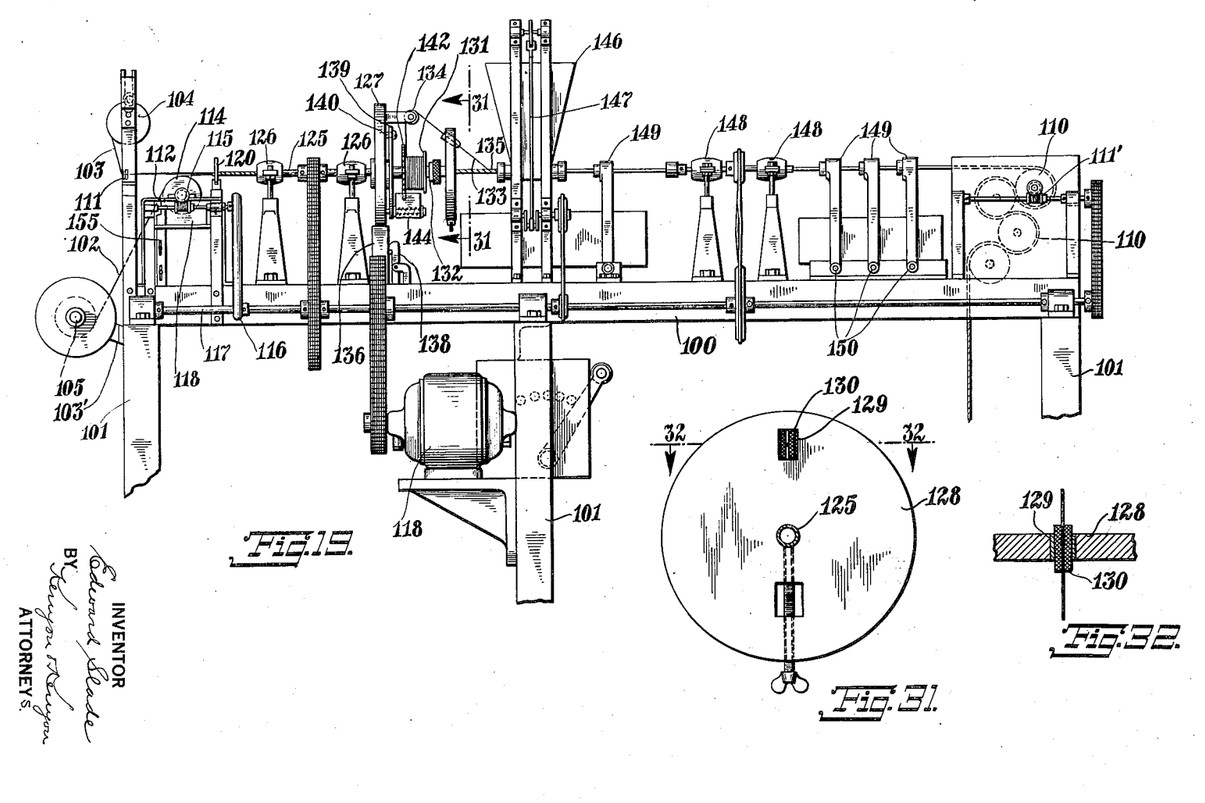
Fig. 19 is a side elevation of a form of my apparatus more specifically adapted for making a yarn for weaving into fabrics suitable for manufacture of brake linings.
Fig. 31 is an end view of the rotating guide plate of the machine taken across the line 31—31.
Fig. 32 is a section showing binder passing through cushion in guide plate along the line 32—32 of Fig. 31.
Figures 20, 23:
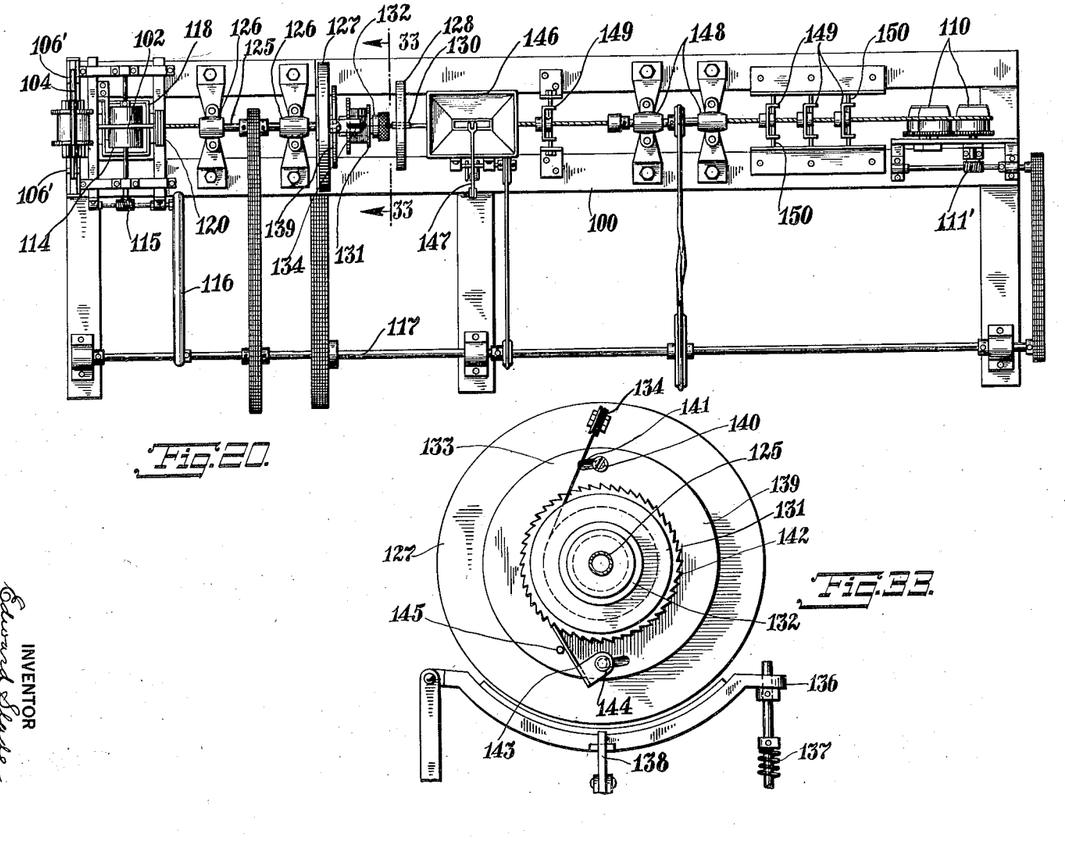
Fig. 20 is a plan view of same.
Fig. 23 is an end elevation of core supply with tension device.
Figure 21:
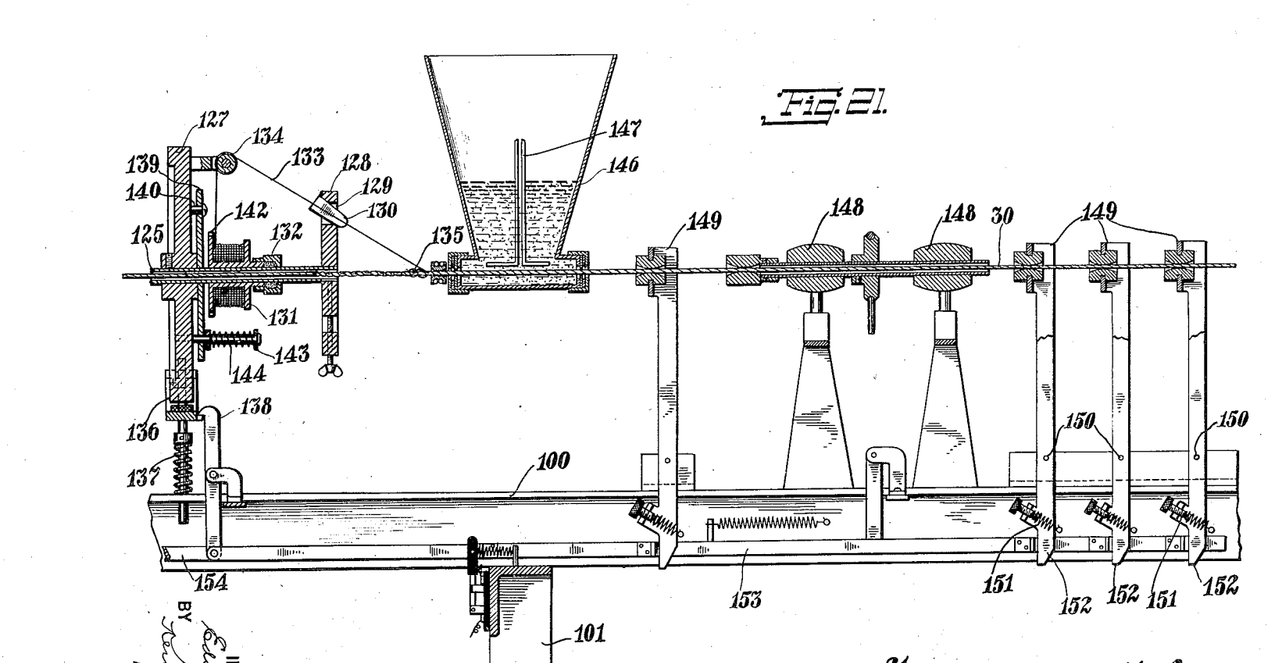
Fig. 21 is a side section through the center of a part of my apparatus.
Figures 22, 26:
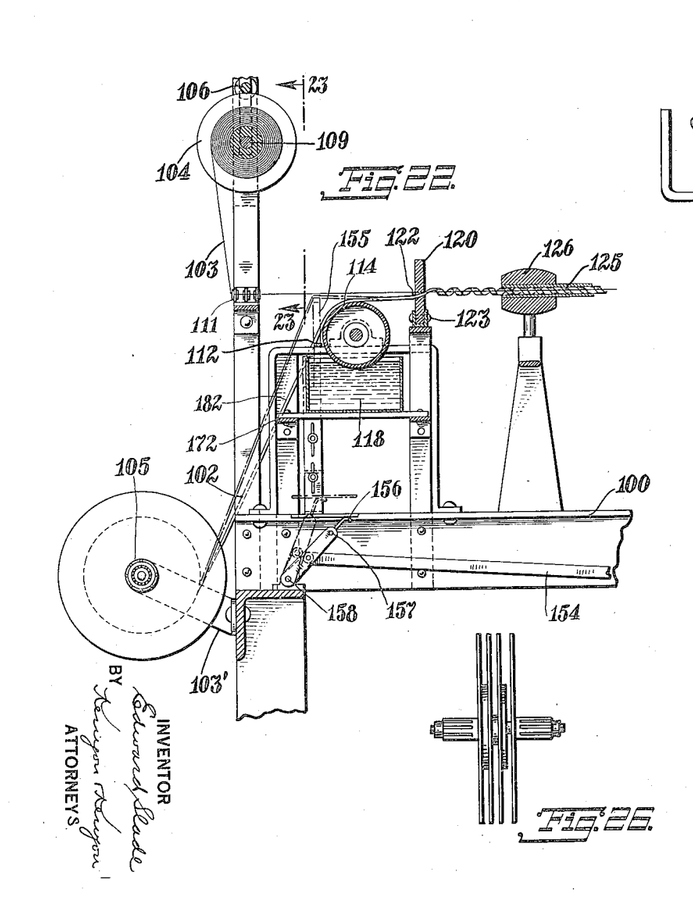
Fig. 22 is a section of the feeding end of the apparatus.
Fig. 26 is a view of ball bearing rolls for holding supply strips.

In Fig. 17, I illustrate a modified form of folding and guiding mechanism consisting of a bridge 25b, which is provided with a central die seat 26, a passage and a series of dies seats 27b, each provided with suitable and adjustable cross bars 26b. By substituting this form of bridge in the machine previously described, I can wrap a multiplicity of covering strips upon the wire core in a single operation and thus build up a multiple-covered strand, all bound by a single binding element. The resulting strand is illustrated in Fig. 18 and consists of the core 1b and the first-applied strand 2b. Around the core and the strand 2b is applied a series of additional covering strips 3b. These may be so wound as to have the line of edges of each out of register. The whole covered strand is tightly held by binder element 5b wound in opposite convolutions. This form of strand is very useful in connection with electrical cables made for the purpose of carrying high voltage electric currents. It will be noted that the whole strand is built up as a single operation.

In Figs. 19-34, I have shown a modified form of machine more particularly adapted for making a strand suitable to be woven into fabric for use as a brake lining. In this modification, the machine comprises a base 100 supported by a suitable frame 101. In making a strand for brake linings, it is desirable to use a thin wire core and cover the same with an asbestos strip. The binder is preferably made likewise of a thin metallic wire. The thin wire core and binder during the operation of the machine becomes twisted in and with the covering strip and thereby a strand or yarn is produced consisting entirely of asbestos and wire with the wire twisted in and around the asbestos in such a manner as to strengthen same and make the strand or yarn suitable for weaving into fabrics for brake linings.

Core 103 is advanced through the machine from the core-feeding rolls 104 by means of core-advancing rollers 110. At the supply end or rearward end of the machine, a bracket 103' supports shaft 105, on which supply rolls of strip sheet material 102, such as asbestos, are adapted to be mounted. The core 103 is fed from a transversely movable carriage 108, traveling upon a support 109. The traveling carriage for the core is therefore able to move laterally as well as to rotate. It is held against a too-free rotation by a weighted bar 106 which is loosely mounted on the top of the traveling carriage 108 between guides 106'.

The core, after being drawn from the rolls by the core-advancing rollers passes downwardly and through guide 111, advancing therefrom through the machine.

The strip of covering material passes from the supply spool and by a wiping edge 112 over a drum 114. Drum 114 is rotatably operated by means of worm 115 operated by a chain or belt 116 moving from countershaft 117, which in turn is operated through suitable connections by a motor 118. The countershaft 117 is also adapted to operate the other driven parts of the machine. The gearing between the drum 115 and the motor 118 is such that this drum is adapted to drive positively the covering strip into the machine at a speed slightly greater than the speed at which the core is advanced. This speed should be just sufficiently greater than that of the advancing core to compensate for the subsequent wrapping of the strip about the core and to cause both core and strip to advance at the same speed after the wrapping has taken place. When properly geared to accomplish the above purpose, it will make no difference at what speed the machine is operated, as the wheel will be driven at the correct proportionate speed to the advancement of the core.

The drum 114 is likewise adapted to operate as a moistener for the strip, and during its rotation the surface of the drum passes through a bath 118 where it picks up a surface quantity of the moistening material, preferably water, and moistens the covering strip as it passes over the drum.

Figures 23, 24, 25:
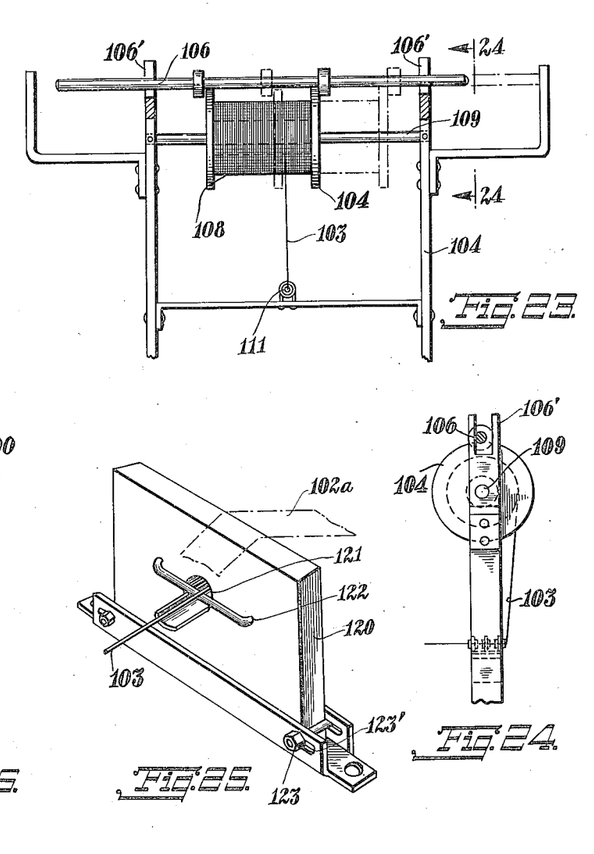
Fig. 24 is a side elevation of same.
Fig. 25 is a perspective folding and guiding die.
Figure 24:
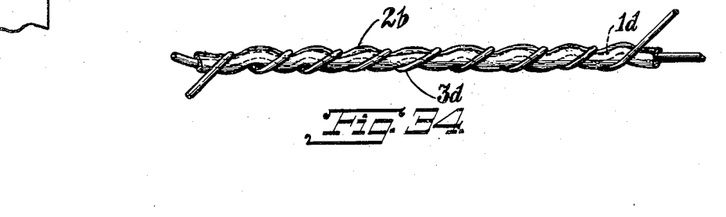
Figure 27:
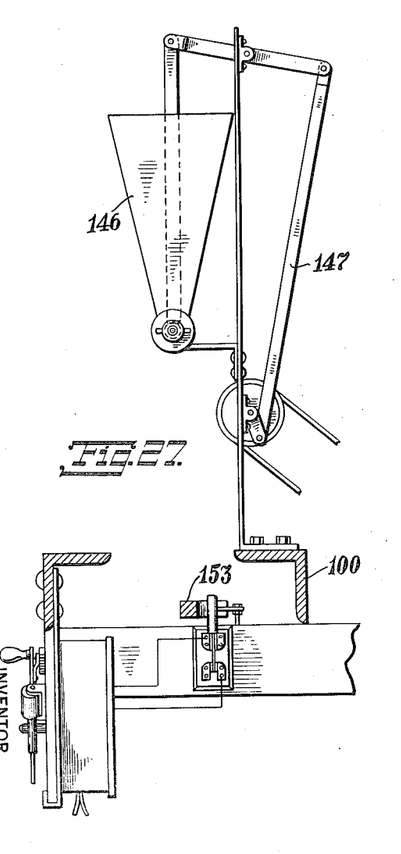
Fig. 27 is a view of floats hopper and agitating device.
Figures 28, 29, 30:
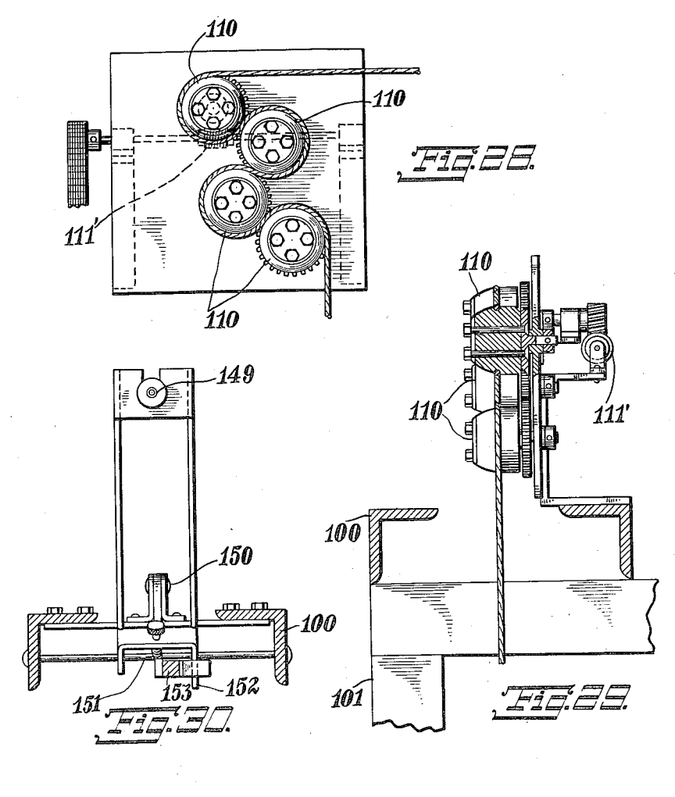
Fig. 28 is a side view of timed core-advancing rollers.
Fig. 29 is an end view, partly in section of same, showing worm gear drive.
Fig. 30 is a detail front view of die-carrying arm and tripping device, taken along line 30—30 in Fig. 21.

After passing over the drum, the covering strip 102, together with the core 103, passes through a folding and guiding mechanism which consists of a bridge 120 having a small central passage 121. Across this passage is placed a bar 122. The core 103 preferably passes over the bar and the covering strip passes on the other side of and under the bar. In this particular machine, I have described its operation in applying a single covering strip to the wire core. In making a strand for brake lining, I have found that it is preferable to use a single covering. Sometimes, however, additional coverings are desirable, and in such case the additional covering strip may be fed from suitable rolls and over the top of the bridge as shown in Fig. 25, the additional strip being designated as 102a. The folding and guiding mechanism is adjustable by means of screws 123 located in the slots 123' and serves to bring core and covering into juxtaposition, being separated, however, by the cross bar 122, and serves as a base preventing any further rearward twisting or rotation of the strip. The folding and guiding mechanism likewise causes the covering strip 102 to assume a sheathlike form around the core. In order to accomplish this latter purpose, it is necessary that the central passage 121 be of smaller diameter than the width of the covering strip 102.

The core and the strip are then passed forward into and through a hollow rotatable tube 125, without, however, coming into operative frictional engagement. The hollow rotating shaft is supported in bearings 126 and is rotated by a suitable connection with the countershaft 117.

A rotatable head 127 is fixedly mounted on the hollow shaft 125 and rotates therewith and a guide plate 128 is likewise fixedly secured upon the rotatable hollow shaft at a position spaced forwardly from the head 127. This guide plate is provided with an opening 129 in which is seated a guiding cushion 130. A binder supply spool 131 is mounted upon the hollow shaft 125 and is free to rotate thereupon and in relation to the head 127. A stuffing box 132 adapted to provide adjustable frictional engagement between the spool and the hollow shaft. A binding element 133, preferably a thin metallic wire, is wound upon the spool in the direction of rotation of the head and is led from the spool over pulley-guiding means 134 through the cushioned opening 129 in the guide plate 128 to the core at 135.

The advancing of the core and the rotation of the head 127 causes the binding element to be wound around the core and loosely-applied covering strip or strips, tightly binding the coverings to the core at the point 135. The tension under which the binding element is applied to the core causes the covering strips to twist about the core from the point 135 rearwardly to the folding and guiding mechanism 120. Due to this twisting of the strips about the core, the strips will completely wrap and envelop the core when bound in place by the binding elements.

As shown in Fig. 33, braking mechanism for stopping the rotation of the head 127 is provided, consisting of a pivoted brake member 136 normally forced against the head 127 by spring 137 but held out of frictional engagement with the head by means of pivoted catch 138. Upon the cutting off of the motor or a stoppage occurring in the dies as hereinafter described, the pivoted lever and catch 138 releases the brake member 136, which is immediately forced into frictional engagement with the head 127, braking same.

The spool 131 carrying the binding element, except for the frictional engagement through the packing box 132, is free to rotate upon the hollow shaft 125 and in relation to the head 127. In order to prevent the breakage of the binding element due to the continued rotation of the spool upon the sudden cessation of rotation of the head following the application of the brake member, I have provided similar positive means for preventing the momentum of the spool from causing such continued rotation such as described in connection with my other form of machine. Such means consists of a face plate 139 mounted on the head 127 by screws 140 through slots 141. The spool is provided with a ratchet 142 and a dogging mechanism 143 mounted on the head and normally urged into engagement with the ratchet by resilient member 144. The face plate carries pin 145 adapted to operate the dogging mechanism upon relative rotation of the face plate upon the head.

The core, coverings and binder, forming now a wrapped and bound covered wire, then enter and pass through a tank 146 containing a bath of impregnating solution. This bath should be such as to assist in rendering the strand waterproof and to toughen it to withstand abrasive forces, at the same time rendering it flexible. I have found that an oxidizing oil solution is suitable for this purpose. The impregnating solution is adapted to be continually stirred up by agitator 147 operated by suitable connections from the countershaft.

The built-up strand then passes through a series of compacting and sizing dies 148 and 149.

The die 148 is adapted to be rotated by connections with the countershaft, preferably in a direction of rotation opposite to that of the head 127, such rotation assisting in compacting and sizing. The dies 149 are pivoted at 150 and normally held in place by means of springs 151, such as to function normally as dies, but upon the application of undue pressure to the dies, due to clogging or stoppage, such dies are adapted to yield. The lower end of the die levers 152 are adapted to operate a bar 153, which operates a switch, cutting off current from the motor 118 and also operates the trip lever 138, releasing the braking member and thereby immediately stopping the rotation of the head 127.

In connection with the moistening drum 114, I have provided an automatic covering strip lifting device for the purpose of lifting the covering strips away from the moistening drum upon the cessation of operation of the machine, thus preventing the same from absorbing too much moisture and becoming too soft and breaking upon resuming the operation of the machine. This automatic tripping device is operated by the bar 154, in turn operated by the switch on the motor, and consists of an upstanding portion 155 normally located below the line covered by the covering strips passing from the feed rollers over the drum. The upstanding portion has a base 156, under which is placed a pivoted lever 157, pivoted at 158 and operated by bar 154. Upon the cessation of operation of the machine, the bar 154 is moved rearwardly and thereby lifts the upstanding member 155 into the position shown in dotted lines in Fig. 22, thereby lifting the covering strip away from the moistening drum 114. Upon resuming the operation of the machine, the bar 154 moves in the opposite direction and permits the covering strip to drop back upon the moistening drum.

The built-up strand, after going through the dies 148, 149, passes around core-advancing wheels 110. These wheels are mutually geared to one another, and one of them is operated by a worm gear 111' driven by suitable connections from the countershaft 117.

It will be seen from the foregoing description that I have provided an apparatus and a method of making a covered strand or yarn consisting solely of a thin metallic core, a fibrous covering, and a metallic binder wherein the fibrous covering such as asbestos and the wire are thoroughly intermixed, making a strand suitable for use as a brake lining, and wherein the strand is impregnated with the proper solutions and wherein these steps occur in a single operation.

In Fig. 34, I have illustrated a section of a strand of wire produced in the machine just described. It consists of a thin metallic core $1d$ which has been caused to assume a somewhat spiral form, and surrounding which is a convolute covering of an asbestos strip $2d$ and which is securely bound by additional wire $3d$ wound in spiral and convolute form about the covering and core.

I claim:

1. In a machine for applying a covering to a core, the combination of core advancing means, means for loosely supplying a covering strip to the core, a folding and guiding die and supplemental means for angularly adjusting the covering strip approximate its point of application to the core, and means for rotating under tension a binding element around the core and loosely applied covering strip.

2. In a machine for applying a covering to a core, the combination of core advancing means, means for loosely supplying a plurality of covering strips to the core, including a plurality of spaced guiding means adapted to prevent twisting of the strips and to fold the strips successively about the core at spaced points, and means for winding under tension a binding element in spaced convolutions around the advancing core and covering strips loosely applied thereto.

3. In a machine for applying a covering to a core, the combination of core advancing means, means for loosely supplying a plurality of covering strips to the core, including a folding guide for one of said strips centrally positioned with respect to the advancing core and a folding guide spaced therefrom and means for adjusting the angular position of the strip passing through said die, and means for rotating under tension a binding element around the advancing core and covering strips loosely applied thereto.

4. In a machine for applying a covering to a core, the combination of core advancing means, means loosely supplying a covering strip along said core, means rearwardly placed preventing rotation of the covering strip, means for applying a binder under tension around said core and covering comprising a rotatable head, a binder feeding mechanism mounted on said head, and positive means preventing relative motion of said feeding mechanism and said head in event of stoppage of operation of said machine.

5. In an apparatus for applying a cover to a core, the combination of a rotatable member, a separately rotatable attachment mounted thereon, means for advancing a core through said member and inertia operated means supported by said rotatable member for preventing relative motion of said member and said attachment upon cessation of rotation of said member.

6. In an apparatus for applying a covering to a core, a rotatable member, a separately rotatable attachment mounted thereon, means for advancing a core through said rotatable member, a plate mounted on said member and having limited movability thereupon, and means operable by said plate to prevent relative rotation of said member and said attachment upon cessation of rotation of said member.

7. In an apparatus for applying a covering to a core, a rotatable member, a separately rotatable attachment mounted thereon, means for advancing a core through said rotatable member, a plate provided with slots, means attaching said plate to said member through said slots, dogging means mounted on said member and operable by motion of said plate and means co-operating with said dogging means on said attachment to prevent relative motion of said member and said attachment upon cessation of rotation of said member.

8. In a machine for making a fibrous-covered strand, means for feeding a covering strip over a moistening drum, means for folding said strip about a core and strip-lifting means adapted to lift said strip away from said moistening drum upon cessation of operation of the machine.

9. In a machine for applying a covering to a core, the combination of advancing means, means for loosely applying covering strips, means to fold said strips successively about said core, and means for applying a binding element in spaced convolutions.

10. In a machine for applying a covering to a core, the combination of core advancing means, means for loosely applying a plurality of covering strips to the core, means to fold the strips successively about the core at spaced points, and means for winding a binding element under tension around the advancing core and covering strips in spaced convolutions.

11. In a machine for applying a covering to a core, the combination of core advancing means, means for successively folding a plurality of covering strips around said core, and means for winding under tension a binding element in spaced convolutions around the advancing core and covering strips loosely applied thereto.

In testimony whereof, I have signed my name to this specification.

EDWARD SLADE.